US012729568B2

(12) United States Patent
Parks

(10) Patent No.: US 12,729,568 B2
(45) Date of Patent: Sep. 8, 2026

(54) SOFT OPENING LATCH FOR AN AUTOMOTIVE VEHICLE

(71) Applicant: FCA US LLC, Auburn Hills, MI (US)

(72) Inventor: David R Parks, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/950,334

(22) Filed: Nov. 18, 2024

(65) Prior Publication Data

US 2026/0139521 A1 May 21, 2026

(51) Int. Cl.

*E05B 81/04* (2014.01)
*E05B 77/36* (2014.01)
*E05B 81/14* (2014.01)
*E05B 81/20* (2014.01)
*E05B 81/56* (2014.01)

(52) U.S. Cl.

CPC .............. *E05B 77/36* (2013.01); *E05B 81/04* (2013.01); *E05B 81/14* (2013.01); *E05B 81/20* (2013.01); *E05B 81/56* (2013.01)

(58) Field of Classification Search

CPC .......... E05B 81/14; E05B 81/18; E05B 81/20; E05B 81/28; E05B 83/16; E05B 83/18; E05B 83/24; E05B 77/36

See application file for complete search history.

(56) References Cited

U.S. PATENT DOCUMENTS

| | | | | |
|---|---|---|---|---|
| 10,066,426 | B2 | 9/2018 | Hunt et al. | |
| 10,767,397 | B2 | 9/2020 | Ottino et al. | |
| 2011/0016794 | A1* | 1/2011 | Nishikibe | E05B 81/20 49/359 |
| 2018/0100331 | A1* | 4/2018 | Cumbo | E05B 81/68 |
| 2019/0301212 | A1* | 10/2019 | Digel | E05B 81/14 |
| 2019/0338568 | A1* | 11/2019 | Klein | E05B 81/16 |
| 2019/0376323 | A1* | 12/2019 | Rosales | E05B 81/22 |
| 2024/0110411 | A1* | 4/2024 | Johann | E05B 81/06 |

* cited by examiner

*Primary Examiner* — Kristina R Fulton
*Assistant Examiner* — Emily G. Brown
(74) *Attorney, Agent, or Firm* — Jeremy J. Klobucar

(57) ABSTRACT

A method and system for unlatching a latch includes positioning a ratchet with a compartment door in a closed position with a cinch lever, a cinch actuator and a pawl in a home position, the ratchet closed with a striker fully engaged, and activating the cinch actuator to engage the cinch lever to hold the ratchet in the fully closed position. The method includes moving the pawl to an open position, returning the cinch actuator and the cinch lever to the home position to moving of the ratchet from a home position to a secondary position while returning the pawl to the home position, positioning the ratchet in the secondary position and the cinch lever, the pawl, and the cinch actuator and cinch lever in the home position. The method includes releasing the pawl to the fully opened position and moving the ratchet to a fully opened position to allow the striker to release from the ratchet.

14 Claims, 10 Drawing Sheets

SOFT OPENING LATCH FOR AN AUTOMOTIVE VEHICLE

FIELD

The present disclosure relates to a latch for a hood of a vehicle, and, more specifically, to latch system for a vehicle to provide a controlled release to an open position.

BACKGROUND

This section provides background information related to the present disclosure which is not necessarily prior art.

Openings within a vehicle such as a trunk, hood or front trunk (frunk) have latches that are released to enable the opening of the door or moving panel that encloses the opening.

A front trunk or hood of a vehicle typically has a first latch position and a second latch position. For a hood or frunk door, a "pop" noise is typically heard when unlatching from a first position to a secondary position as formed. The noise from the release is undesirable.

SUMMARY

This section provides a general summary of the disclosure and is not a comprehensive disclosure of its full scope or all of its features.

The present system and method provide a soft release for the latch to provide a better user experience.

In one aspect of the disclosure, a method for unlatching a latch includes positioning a ratchet with a compartment door in a closed position with a cinch lever, a cinch actuator and a pawl in a home position, the ratchet closed with a striker fully engaged, and activating the cinch actuator to engage the cinch lever to hold the ratchet in the fully closed position. The method includes moving the pawl to an open position, returning the cinch actuator and the cinch lever to the home position resulting in the ratchet moving from a fully closed position to a secondary position while returning the pawl to the home position, positioning the ratchet in the secondary position and the cinch lever, the pawl, and the cinch actuator and cinch lever in the home position. The method includes releasing the pawl to the fully opened position and moving the ratchet to a fully opened position to allow the striker to release from the ratchet.

In another aspect of the disclosure, a system for releasing a compartment door having a striker that includes a cinch lever, a cinch actuator coupled to the cinch lever, a latch coupled to the compartment door in a closed position with the cinch lever, a cinch actuator and a pawl in a home position, the ratchet closed with the striker fully engaged. A controller is programmed to activate the cinch actuator to engage the cinch lever to hold the ratchet in the fully closed position. The controller is programmed to move the pawl to an open position. The controller is programmed to return the cinch actuator and the cinch lever to the home position to move the ratchet from a home position to a secondary position while returning the pawl to the home position. The controller is programmed to control the release actuator to position the ratchet in the secondary position and the cinch lever, the pawl, and the cinch actuator and cinch lever in the home position. The controller is programmed to control the release actuator to release the pawl to the fully opened position to allow the ratchet to move the latch to a fully opened position releasing the striker from the ratchet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1A:
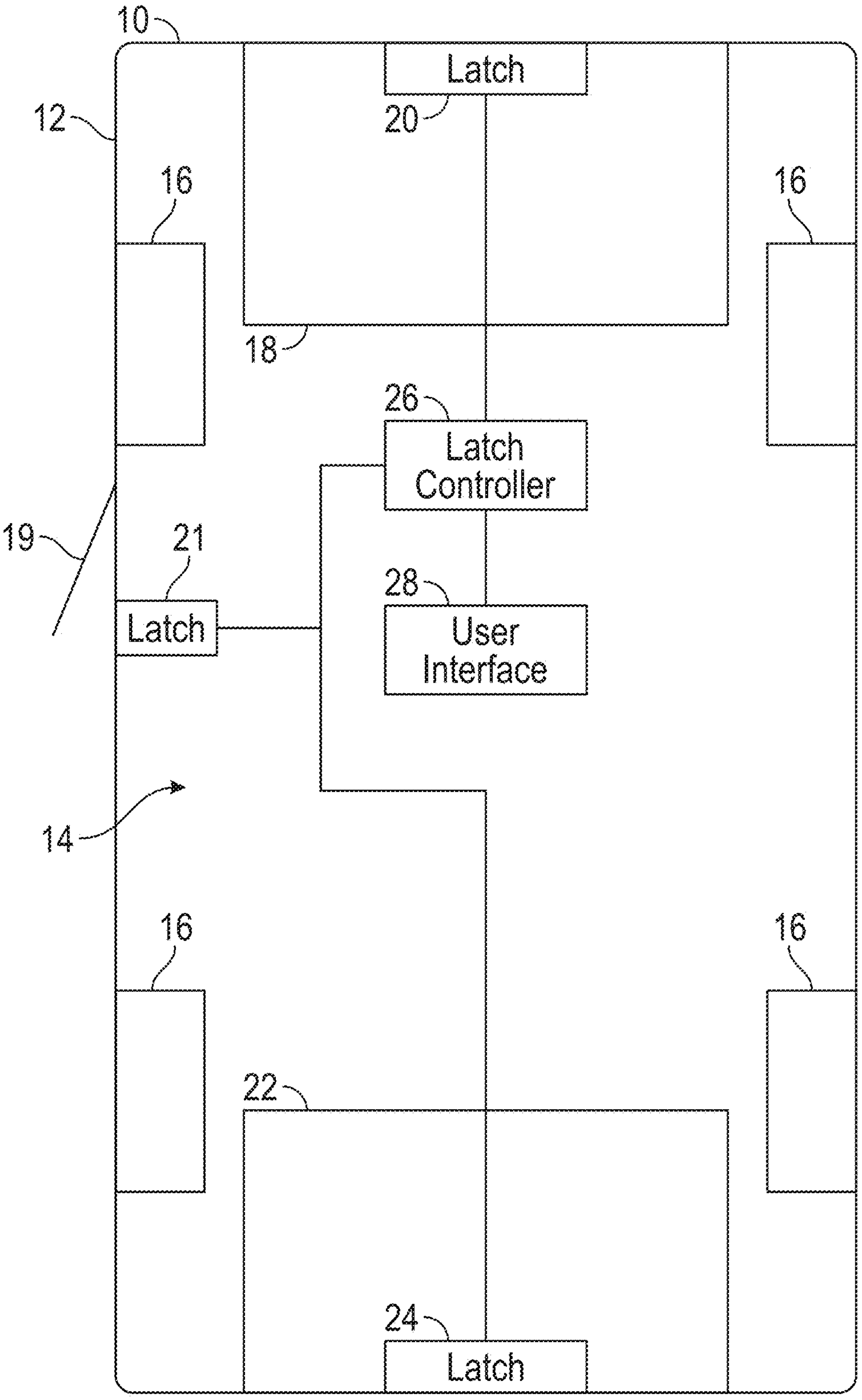
FIG. 1A is a high level block diagrammatic view of a vehicle.

Referring now to FIG. 1A, a simplified vehicle 10 is illustrated having a body 12 that defines a passenger compartment 14. The vehicle 10 has wheels/tires 16 that move the vehicle 10 in the desired direction. The body 12 has a compartment door that may be referred to as a hood or a front trunk door. The system may also be used for a passenger side door 19 and a side door latch 21 latch of the vehicle 10. In such a case the opening may not have a secondary position, but the release would be to a primary position. The compartment 18 therefore covers an engine compartment in an internal combustion engine vehicle or a front trunk in an electrical vehicle. The compartment door 18 is held into a closed position by a latch 20. The body 12 may also have a rear compartment door 22. The rear compartment door 22 is held into a closed position by a latch 24. The compartment door 22 may be used to cover a trunk or storage area within the rear portion of the vehicle 10. The latches 20, 24 are electrically controlled by a latch controller 26. Of course, more than one controller may be provided, one for each latch for example. The latch controller 26 may operate in a predetermined manner as described in greater detail below. The latch controller 26 may be operated in response to user input at a user interface 28. The user interface 28 may be, but is not limited to, a button, dial, switch and a touch screen. In a trunk or frunk, a switch or user interface may be positioned inside as well as outside the vehicle 10. In response to selecting an open or unlatched portion of the user interface 28, the latch controller 26 may control the unlatching of the latches 20, 21, 24.

Figure 1B:
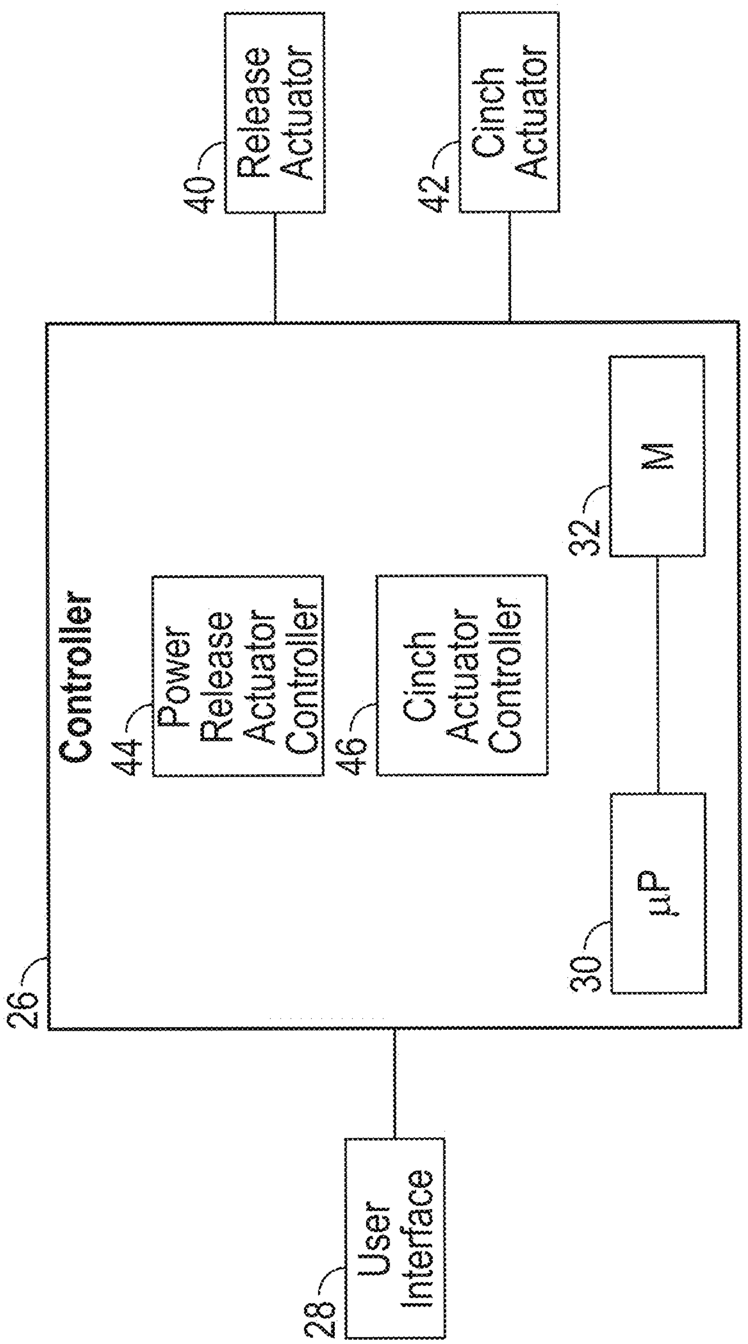
FIG. 1B is a high level block diagrammatic view of the latch control system.

Referring now to FIG. 1B, a high level block diagrammatic view of the controller 26 is illustrated in greater detail. The user interface 28 of FIG. 1A is in communication with the controller 26. The controller 26 has a microprocessor 30 that is in communication with a memory 32. The memory 32 is a non-transitory computer-readable medium that includes machine-readable instructions that are executable by the processor 30. The machine-readable instructions are used for controlling a power release actuator 40 and a cinch actuator 42. That is, the controller 26 is programmed to perform various steps.

The controller 26 has a power release actuator controller 44 and a cinch actuator controller 46, both of which are electric actuators. The power release actuator controller 44 is used to control the actions of the power release actuator 40. The power release actuator 40 has an actuator housing 40A. The cinch actuator controller 46 is used to control the cinch actuator 42. The process for releasing the latch will be described in greater detail below and is based upon the actions of the signal received from the user interface 28.

Referring now to FIGS. 2A-2G and FIG. 3, a method for unlatching a latch assembly 210 is set forth. In this example, a striker 212 is fastened to a plate 214. The plate 214 is fastened to a compartment door 216. The compartment door 216 may be one of the compartment doors 18 or 22 described above relative to FIG. 1. The latch assembly 210 is placed into a latched position. The latch assembly 210 includes a pawl 220 that has a member 220A that has an opening 220B that rotates around a stationary member 222. An engagement member 220C extends from the member 220A. A first engagement wall or surface 220D extends outward from the member 220A. The engagement surfaces 220D, 220E form an engagement channel 220F therebetween. The ratchet 230 has a ratchet arm 230A that has a primary position 230B and a secondary position 230C. The striker 212 is received within a channel 230D formed by a second arm 232. The ratchet 230 has a first engagement tooth 234 spaced apart from a second engagement tooth 236. The first engagement tooth 234 and the second engagement tooth 236 are used to engage the engagement surfaces 220D of the engagement channel 220F as described in greater detail below. A pin 238 also extends from the ratchet 230. The ratchet 230 has an opening 240 that rotates around a fixed portion 242.

The release actuator 40 has an extension member 250 that is illustrated in the retracted position relative to the housing 40A. The extension member 250 extends from the release lever actuator in response to a release signal as will be described in greater detail. The cinch actuator 42 has a coupling member 260, a retractable member or cable 262 and a fixed member 264. In response to an electrical signal from the controller 26, the retractable member or cable 262 may extend selectively so that the coupling member engages or disengages a cinch lever 270. The cinch lever 270 has an engagement portion 270A located at a first end 270B of a L-shape member 270C. A second end 270D of the L-shape member 270C has an engagement portion or guide 270F. The extension member 270E is used to engage the ratchet as will be described in greater detail below. The extension member 270E is coupled to the second end 270D at the pivot 270G. The cinch actuator 42 may be coupled to a motor 280 that is used to move the coupling member 260 and the cable 262 into and out of the fixed member 264.

Figure 2A:
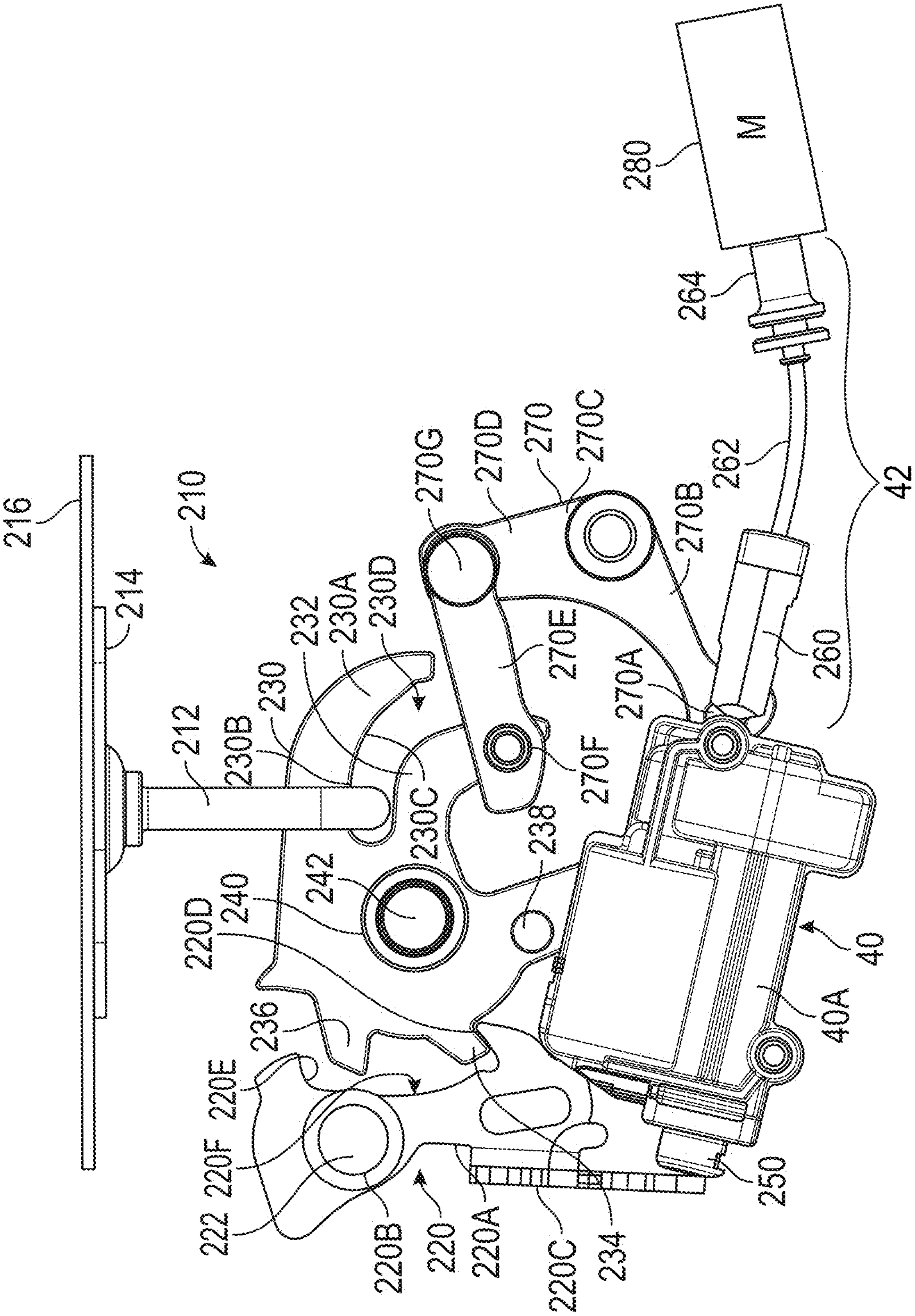
FIG. 2A is a diagrammatic view of the latch assembly in the fully closed position.
Figure 3:
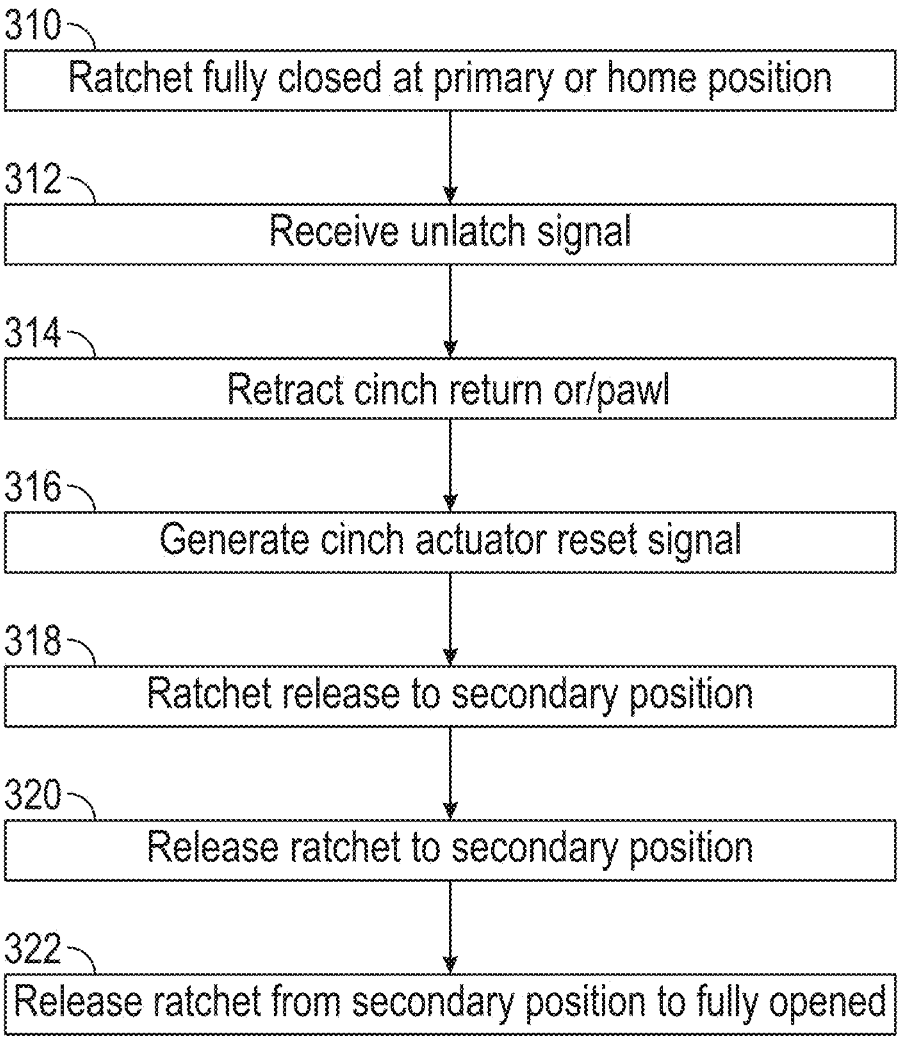
FIG. 3 is a flowchart of a method for operating the latch assembly.

Referring now also to FIGS. 3 and 2A, the latch is illustrated at a fully closed position at the primary or home position relative to the striker 212 in step 310. In step 310, FIG. 2A shows the pawl 220 in a home position engaging the engagement surface 220D with the engagement tooth 234. The ratchet 230 is in a closed position fully engaged with the striker 212 with the striker 212 in the primary position. The cinch lever 270 is in a home position with the coupling member 260 fully extended from the fixed member 264. The extension member 270E is not yet engaged with the ratchet 230.

Figure 2B:
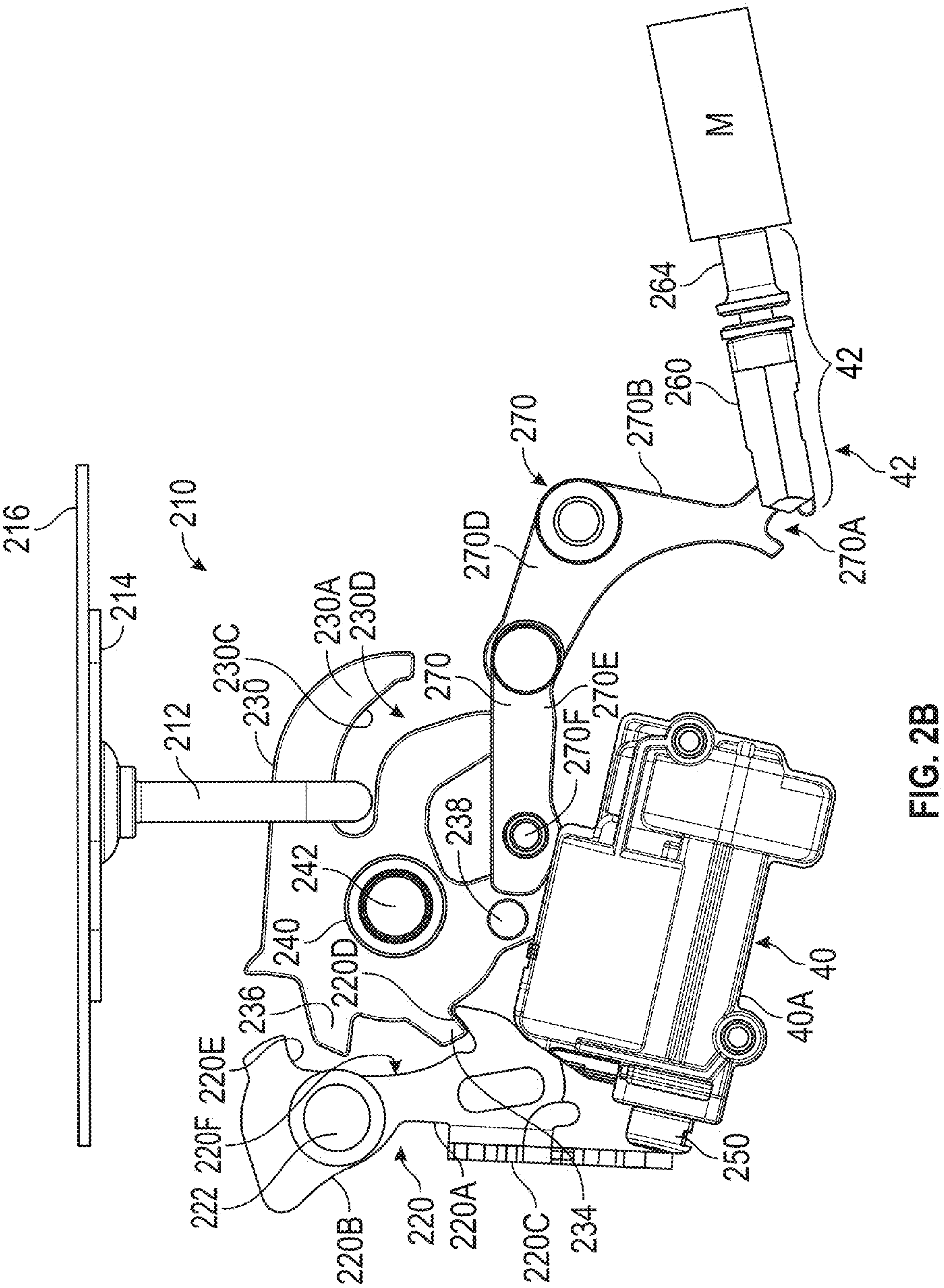
FIG. 2B is a diagrammatic view of the latch assembly with cinch lever holding the ratchet in fully closed position.

In step 312 and in FIG. 2B, an unlatched signal is received from the controller 26. In response to the unlatched signal, the cinch actuator 42 and cinch lever are retracted in steps 314. When retracted, the coupling member 260 and the cable 262 are fully retracted within the fixed member 264. The movement of the coupling member allows the extension member 270E to engage the Ratchet pin 238 and holding the ratchet 230 in the fully closed position. The coupling member 260 engages the engagement portion 270A to pull the L-shaped member 270C towards the fixed member 264. The cinch lever 270 is fully extended and the ratchet 230 is closed upon the striker 212 in the primary position. The pawl 220 is in the home position.

An electrical signal is generated at the controller 26 to control the cinch actuator. This may be referred to as a cinch actuator reset signal. When the cinch actuator reset signal is generated in step 316, the ratchet is slowly or controllable moved to the secondary position.

Figure 2C:
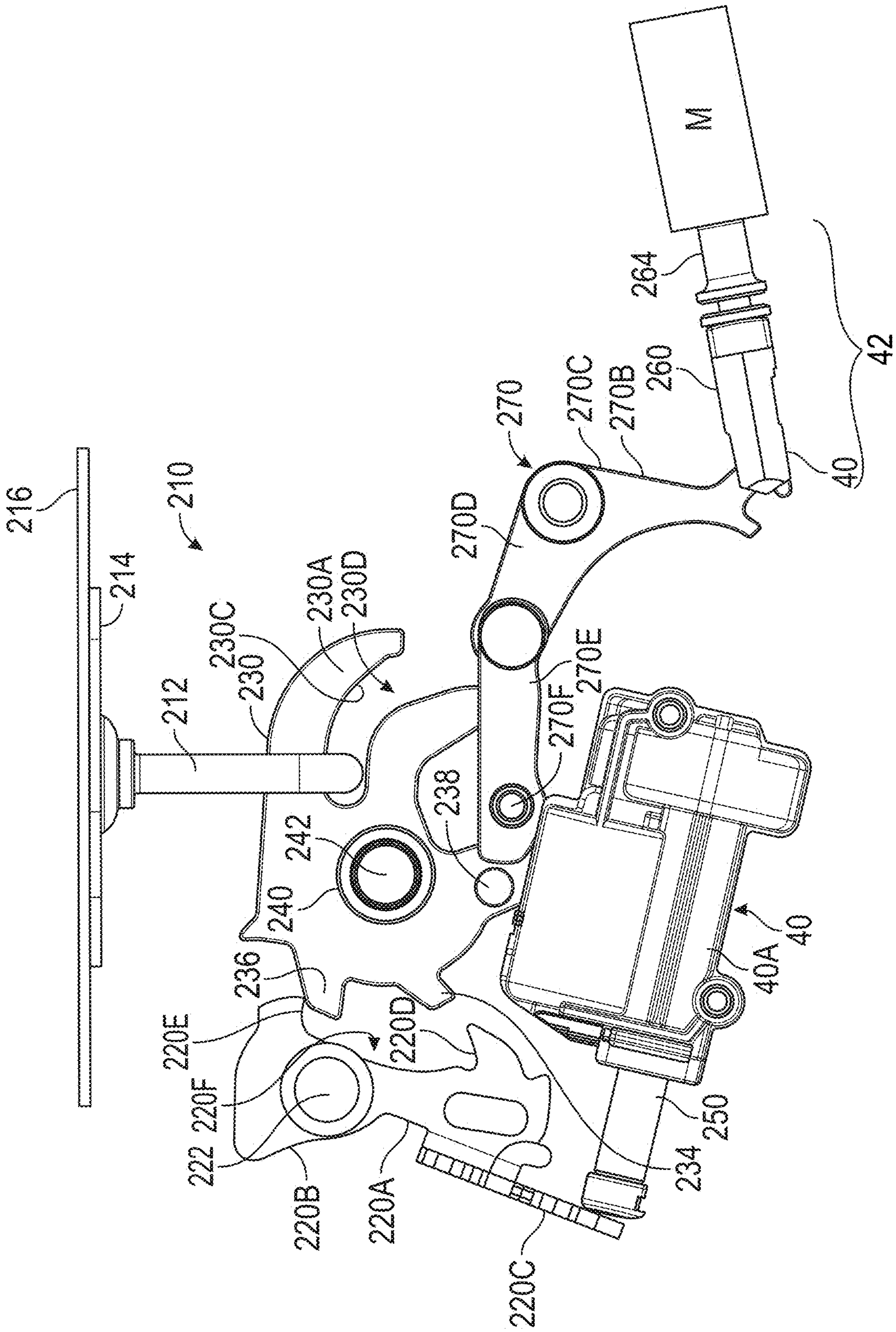
FIG. 2C is a diagrammatic view of the latch assembly with the latch in the first release position with the cinch actuator holding the ratchet in primary position.

In step 318, the ratchet is released in a first release. This is illustrated in FIG. 2C. In FIG. 2C, the cinch actuator 42 is fully retracted with the cinch lever fully extended holding the ratchet 230 in the fully closed position.

The latch 210 is closed, the striker 212 is fully engaged and the pawl 220 is rotated clockwise by the extension member 250 extending from the power release actuator 40. This allows the engagement surface 220D to engage the tooth 236. The ratchet release step in step 318 prevents the ratchet from rotating by engaging the cinch lever 270 and extension member 270E against the pin 238 of the ratchet pin 238 so the ratchet is maintained or held in the position. It should be noted that the ratchet 230 is maintained in the primary or home position fully engaged with the striker 212.

Figure 2D:
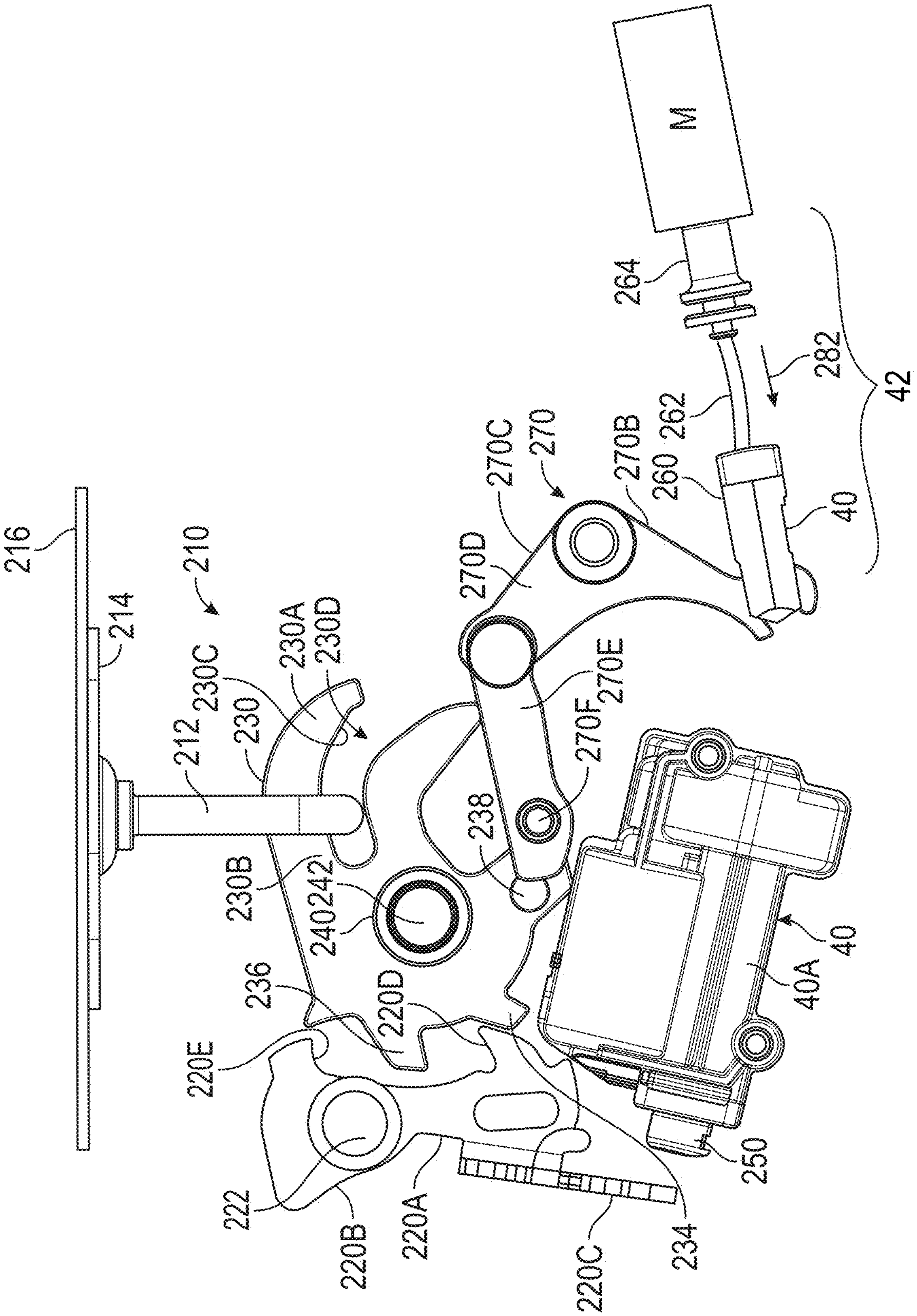
FIG. 2D is a diagrammatic view of the latch assembly with the cinch actuator retracting.
Figure 2E:
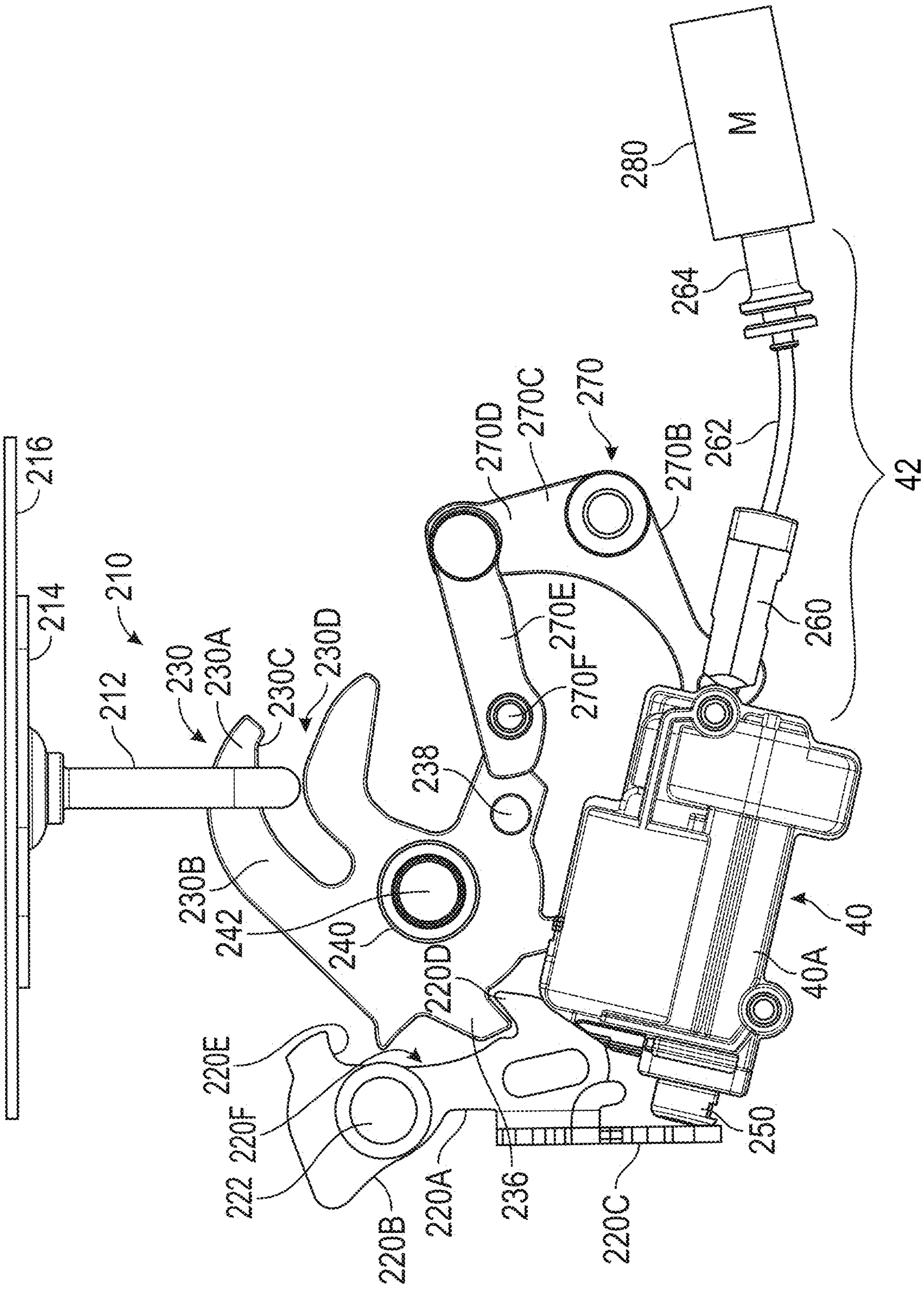
FIG. 2E is a diagrammatic view of the latch assembly with the latch in the secondary position and inch actuator reset.

In FIG. 2D, the movement has just begun and the striker 212 is moved from the primary or home position. The ratchet 230 is causing the striker 212 to move toward the secondary position 230C. In FIG. 2E, the extension member 250 causes the pawl to return to the home position by not engaging the member 220C. In summary, the cinch lever is returning to the home position in which the coupling member 260 and the cable 262 are extended away from the coupling member 260 and the cable 262 are moving in the direction away from the fixed member 264 as indicated by the arrow 282.

Figure 2F:
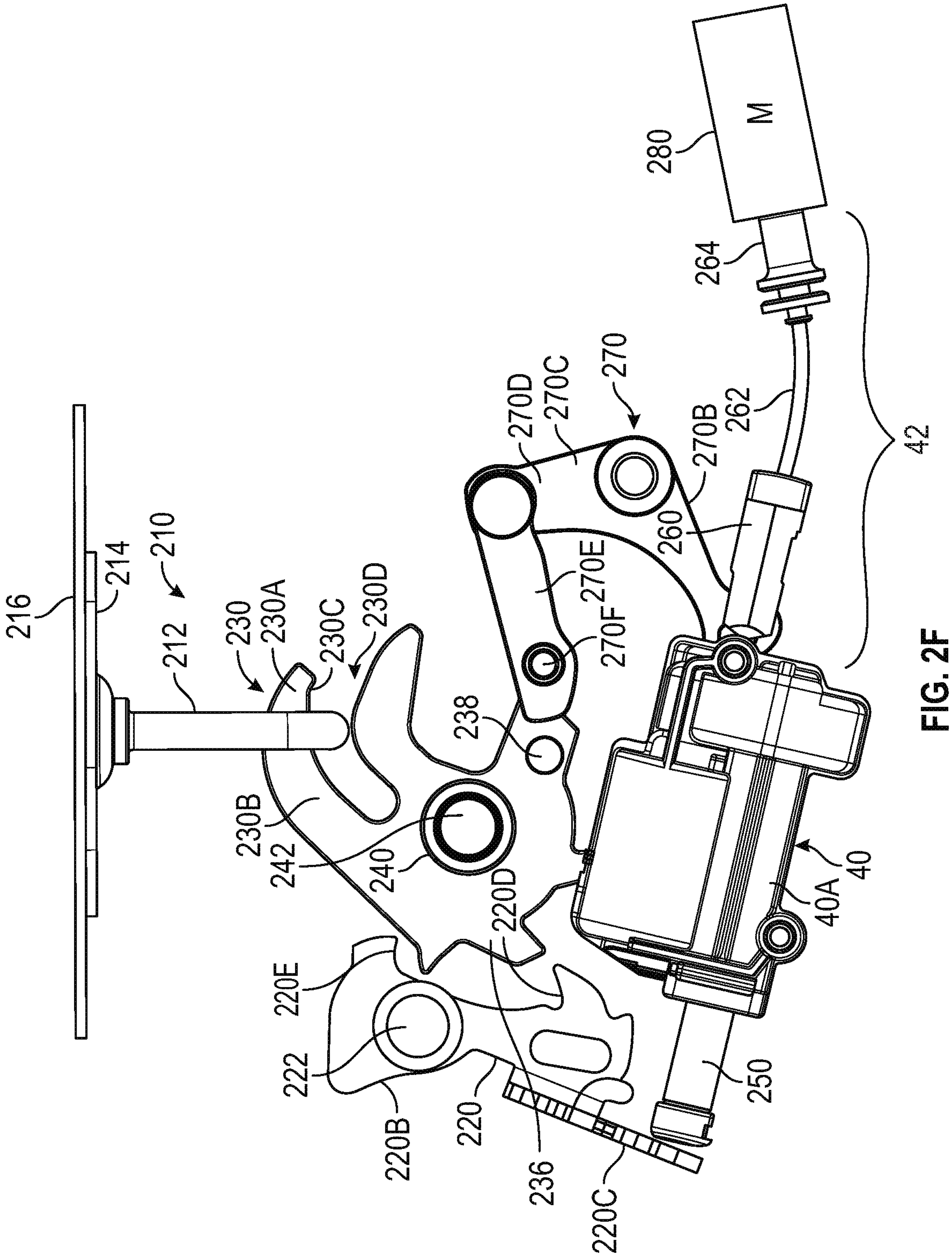
FIG. 2F is a diagrammatic view of the latch assembly in the secondary release position.

In FIG. 2F, the striker 212 is positioned at the secondary position 230C. The cinch actuator 42 has the coupling member 260 positioned at the fully extended position when cable 262 is fully extended from the fixed member 264. The pawl 220, as illustrated in FIG. 2F, is rotated in a clockwise position by pushing the member 220C around the stationary position 222. The extension member 250 is fully extended from the actuator housing 40A. FIG. 2F corresponds to step 320 in FIG. 3.

Figure 2G:
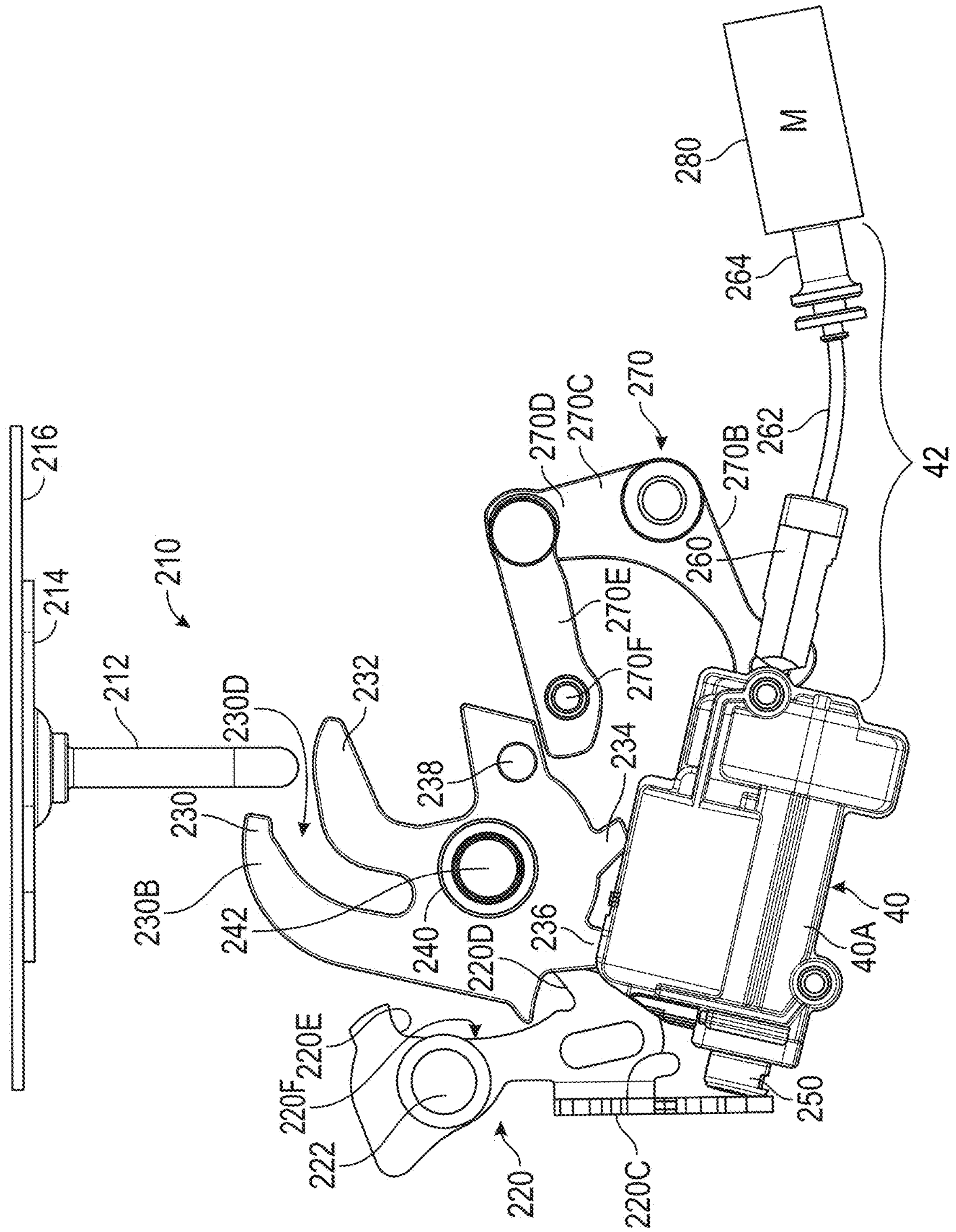
FIG. 2G is a diagrammatic view of the latch fully opened.

In step 322, the ratchet is released from the secondary position so that the compartment door 216 is fully opened. The cinch actuator 42 is in a home position while the cinch lever is also in the home position. The cinch lever 270 is not engaged with the ratchet 230 in this position. In FIG. 2G, the compartment door 216 may be raised and lowered. When lowered fully, the latch assembly 210 engages the latch striker 212 to achieve FIG. 2A.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. 1steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:

positioning a ratchet with a compartment door in a closed position with a cinch lever, a cinch actuator and a pawl in a home position so the ratchet is closed with a striker fully engaged;

activating the cinch actuator to engage the cinch lever to hold the ratchet in a fully closed position while maintaining the pawl in the home position;

moving the pawl to an open position while maintaining the cinch lever in an engaged position to hold the ratchet with striker in the closed position;

returning the cinch actuator and the cinch lever to the home position resulting in the ratchet moving from the fully closed position to a secondary position while returning the pawl to the home position;

positioning the ratchet in the secondary position and the cinch lever, the pawl, and the cinch actuator and cinch lever in the home position;

releasing the pawl to the opened position;

moving the ratchet to a fully opened position to allow the striker to release from the ratchet; and engaging the ratchet with the cinch lever at the engaged position.

2. The method of claim 1 wherein the compartment door comprises a hood.

3. The method of claim 1 wherein the compartment door comprises a frunk door.

4. The method of claim 1 wherein the compartment door comprises a trunk door.

5. The method of claim 1 wherein the compartment door comprises a passenger side door.

6. The method of claim 1 wherein positioning the ratchet with the compartment door in the closed position comprises engaging a tooth of the ratchet with an engagement wall of the pawl.

7. The method of claim 1 wherein moving the pawl to the open position comprises moving the pawl to the open position using an electric actuator.

8. A system for releasing a compartment door having a striker comprising:

a cinch lever;

a cinch actuator coupled to the cinch lever;

a latch comprising a rachet and a pawl coupled to the compartment door in a closed position while the cinch lever, the cinch actuator, the ratchet and the pawl are in a home position, and the ratchet is closed with the striker fully engaged;

a controller programmed to activate the cinch actuator to engage the cinch lever to hold the ratchet in a fully closed position;

said controller programmed to move the pawl to an open position;

said controller programmed to return the cinch actuator and the cinch lever to the home position to move the ratchet from the home position to a secondary position while returning the pawl to the home position, said controller programmed to control a release actuator configured to position the pawl in the home position while the ratchet is in the secondary position said controller programmed to control the release actuator to release the pawl to the opened position to cause the ratchet to move the latch to a fully opened position releasing the striker from the ratchet;

said controller is programmed to retract the cinch actuator while maintaining the pawl in the home position;

engaging the ratchet with the cinch lever at an engaged position; and the controller is programmed to move the pawl to the open position while maintaining the cinch lever in the engaged position to hold the ratchet and the striker in the home position.

9. The system of claim 8 wherein the compartment door comprises a hood.

10. The system of claim 8 wherein the compartment door comprises a frunk door.

11. The system of claim 8 wherein the compartment door comprises a trunk door.

12. The system of claim 8 wherein the compartment door comprises a passenger side door.

13. The system of claim 8 wherein, when the latch with the compartment door is in the closed position, a tooth of the ratchet engages an engagement wall of the pawl.

14. The system of claim 8 wherein the controller is programmed to move the pawl to the open position by controlling an electric actuator.

* * * * *